United States Patent [19]

Lee

[11] 3,928,355

[45] Dec. 23, 1975

[54] POLYMERIC-ALKYLPHENOLSULFONA-MIDES

[75] Inventor: Richard J. Lee, Downers Grove, Ill.

[73] Assignee: Standard Oil Company, Chicago, Ill.

[22] Filed: Oct. 26, 1972

[21] Appl. No.: 301,121

[52] U.S. Cl....... 260/268 PL; 252/47.5; 260/268 R; 260/543 R; 260/556 AR; 260/556 S
[51] Int. Cl.² .................................... C07D 295/12
[58] Field of Search....... 260/268 S, 268 R, 268 PL, 260/556 AR, 543 R, 556 S

[56] References Cited
UNITED STATES PATENTS

| | | | |
|---|---|---|---|
| 2,655,544 | 10/1953 | McNulty et al. | 260/609 |
| 3,360,464 | 12/1967 | Otto, Jr. | 252/515 |
| 3,772,373 | 11/1973 | Lee | 260/543 R |
| 3,876,709 | 4/1975 | Lee et al. | 260/619 R |

FOREIGN PATENTS OR APPLICATIONS

| | | |
|---|---|---|
| 481,909 | 3/1938 | United Kingdom |
| 1,159,368 | 7/1969 | United Kingdom |

*Primary Examiner*—Paul M. Coughlan, Jr.
*Assistant Examiner*—Jose Tovar
*Attorney, Agent, or Firm*—Fred R. Ahlers; Arthur G. Gilkes; William T. McClain

[57] ABSTRACT

Novel sulfonamides soluble in $C_6$ and higher alkanes and lubricating oils, which are antioxidants therefor preventing oxidative thickening of the oil, are obtained from nuclear carbon-to-carbon dimers to heptemers of 85 to 3,000 MW alkyl-substituted phenol converted to sulfonylchloride by known means and reacted with an amine, preferably an amine having at least two primary amino radicals. Sulfonamides of the monomeric alkylphenols while imparting detergency and dispersancy to lubricating oils prevent oxidative thickening of the oil.

5 Claims, No Drawings

POLYMERIC-ALKYLPHENOLSULFONAMIDES

BACKGROUND OF INVENTION

Alkylphenols having two unsubstituted nuclear positions ortho to the hydroxyl-substituents can be nuclearly carbon-to-carbon coupled by several means through electron transfers by oxidatively removing hydrogen from nuclear carbons ortho to the hydroxyl-radical. It has been found that substantially dimeric alkylphenol can be obtained through said oxidative means either by molecular oxygen (e.g. air) in the presence of cuperousamine (e.g. $Cu_2Cl_2$-trialkylamine) catalyst or in the absence of air with alkali metals (e.g. potassium) ferricyanide in an aqueous alkaline medium. It has also been found that dimeric through heptameric alkylphenols can be quite surprisingly obtained by the oxidative means provided by chromic acid in the presence of acetic acid solution containing dissolved manganese promoter at an oxidation temperature of from ambient to 250°F as disclosed in U.S. Pat. No. 3,876,709. Such carbon-to-carbon coupling by manganese promoted chromic acid is surprising because the alkyl-side chain even when highly branched as in polyisobutyl side chains is not also oxidized either at ambient temperature oxidation coupling conducted for as long as 20 hours or when the oxidative coupling is conducted at 200°F. for 4 hours.

Such oxidative nuclear carbon-to-carbon coupling of alkylphenols is especially useful to couple p-alkyl-substituted phenol wherein the alkyl-substituent has a molecular weight in the range of 85 to 3,000 because the coupled or polymeric p-alkylphenols have on the terminal alkylphenol units active hydrogens on the ring carbons in the position ortho to the carbon having the hydroxyl substituent and said active hydrogens can be readily substituted and the resulting derivatives have properties which not only would be expected from analogous derivatives obtained from monomeric alkylphenols having alkyl-substituents much, 10 to 1,000 times, larger than the 85-3,000 molecular weight but also have properties apparently unique to the derivatives of the coupled or polymeric p-alkylphenols. For example nitrogen-containing derivatives of p-85 MW alkyl-substituted phenol do not impart any significant detergency or dispersancy to lubricating oils but nitrogen-containing derivatives of polymeric p-85 MW-alkyl-substituted phenol impart to lubricating oils detergency-dispersancy properties similar to nitrogen-containing derivatives of monomeric 850 MW alkyl-substituted phenol. Also oil-soluble derivatives of polymeric p-850-3,000 alkyl-substituted phenol improve the viscosity index of lubricating oils as would be expected by similar derivatives of monomeric p-100,000-1,000,000 MW alkyl-substituted phenols.

The foregoing three oxidative means for nuclear carbon-to-carbon coupling of p-alkylphenols is operative regardless of source of the alkyl-substituent. Thus said alkyl substituent of 85-3,000 MW can be a single entity as derived from the alkylation of phenol with a single alkene such as the alkene from alcohol dehydration or the n-alkenes also known as alphaolefins, with fractions of mixtures of alkenes differeing by two carbon atoms (i.e., mixture of $C_{16}$ and $C_{18}$ alkenes) such as close boiling fractions of cracked parafin wax hydrocarbons; or with synthesized mixtures of alkenes obtained by known catalytic (e.g. $AlCl_3$) polymerization of $C_2$ to $C_5$ mono-olefins or mixtures of such mono-olefins or mixtures of such mono-olefins of mixtures of mono-olefins with a small amount of a diene. An example of said mixture of mono- and diolefins is the B-B refinery stream consisting of butane, butene-1, butene-2, isobutene and butadiene in which there is 1–5 weight percent butadiene. Such synthesized polyolefin can, in general, be obtained as products of varying degrees of polymerization and any one polymer product has a wide distribution of different molecular weight entities. Such polymeric products can be distilled to obtain narrower distributions of more closely related molecular weight entities. Any of such polymeric products are, like other polymers, characterized by their number average molecular weight ($\overline{M}_n$) and by their monomer or monomers. Polypropenes, polyisobutylene, polybutenes (polymer containing isobutane units and units of butene-1 and/or butene-2 with no or a small amount of butadiene units) copolymers of ethylene and propene, ethylene and isobutene, terpolymers of either ethylene and propene or ethylene and isobutene and a diene are known and are commercially available with $\overline{M}_n$ from 85–3,000.

A number of catalytic alkylations of phenol with the foregoing 85–3,000 molecular weight and $\overline{M}_n$ alkenes and polyalkenes are known. The known alkylation of phenol with such 85–3,000 MW alkenes and polyalkenes in the presence of $BF_3$ phenate or $BF_3$-phenol complex tends to favor the formation of mono-p-alkyl-substituted phenol. British Patent Specification No. 481,909 published in 1938 teaches such catalytic preparation of 85-253 M.W. p-alkyl-substituted phenols, U.S. Pat. No. 2,655,544 issued Oct. 13, 1953 extends that teaching to the preparation of up to 337 M.W. p-alkyl-substituted phenol and the combined teachings of U.S. Pat. No. 3,360,464 issued Oct. 26, 1967 and British Patent Specification No. 1,159,368 published July 23, 1969 further extend such catalysis to the preparation of 3,000 and higher M.W. p-alkyl-substituted phenols. Those p-85-3,000 alkyl-substituted phenols can be nuclearly carbon-to-carbon coupled by the before described three oxidative means to the starting reactants for the sulfonamides of this invention. Although the polymeric p-alkylphenols need not be a single polymeric entity but can be mixture of dimeric, trimeric, etc. to heptameric entities because of the source of alkyl-substituent or a mixture of dimeric and trimeric, dimeric to tetrameric, penta- and hexameric, hexa- and heptameric, to dimeric to heptameric p-alkylphenols, their molecules can be represented by the formula:

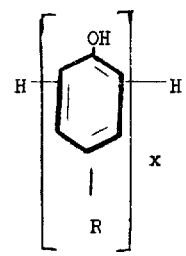

wherein R is the alkyl substituent of 85-3,000 MW including $\overline{M}_n$ and $x$ is an integer from 2 to 7 with the understanding that the hydrogens indicated are each on two different terminal alkylphenol units.

SUMMARY OF INVENTION

The sulfonamides of this invention have one or both of the above indicated hydrogens of the polymeric p-alkylphenol replaced with a radical containing the sulfonamide: —$SO_2N$— radical. The sulfur atom is attached to one ring carbon atom and the valences of the nitrogen are satisfied by hydrogen or by attachment to carbon or an organic group containing atoms of carbon and hydrogen or carbon, hydrogen and nitrogen. Desirably one valence of nitrogen is satisfied by hydrogen and the other by attachment to carbon of said organic groups. Preferably one valence of nitrogen is satisfied by hydrogen and the other is satisfied by attachment to carbon or an organic group consisting of carbon, hydrogen and nitrogen atoms as derived from a di-primary amine.

Such sulfonamides can be prepared by first reacting the polymeric nuclearly carbon-to-carbon couple p-alkylphenol with chlorosulfonic acid, two-three moles of chlorosulfonic acid per sulfonylchloride to be introduced (2–3 moles chlorosulfonic acid for monosulfonyl-chloride and 4–6 moles for disulfonylchloride) or one mole each of sulfurylchloride and chlorosulfonic acid for each sulfonylchloride to be introduced. The use of only chlorosulfonic acid requires the removal of co-product sulfuric acid which can present separation problems. The use of sulfurylchloride and chlorosulfonic acid eliminates co-production of sulfuric acid by forming $SO_2$ and HCl which are gases readily removed from the product of the sulfochlorination process.

The mono- or di-sulfonylchloride of the polymeric p-alkylphenol is then reacted with the amine in the presence of an otherwise inert hydrogen chloride acceptor such as a tertiary amine, preferably pyridine, readily distillable from the sulfonamide. In such sulfonamide formation the HCl co-product is removed by treating the reaction mixture with calcium hydroxide, removing the calcium chloride (e.g. by filtration and distilling of the tertiary amines. Because of the high molecular weight nature of the polymeric p-alkylphenol, the sulfochlorination and sulfonamide reactions are conducted in the presence of a solvent. A $C_6$ to $C_{10}$ alkane hydrocarbon and/or relatively low viscosity oil of the lubricating oil grade comparable to SAE-5W or SAE-10 grade oils are suitable solvents for both the sulfochlorination and the sulfonamide reactions.

SPECIFIC EMBODIMENTS

As hereinbefore stated, the sulfonamides of this invention have one —$SO_2N$< radical replacing one or both the hydrogens indicated as on the terminal p-alkylphenol units of the polymeric p-alkylphenol. The nitrogen from said —$SO_2N$< radical is, of course, derived from the amine reactant which is ammonia when both valences of nitrogen are satisfied by hydrogen, a mono-primary amine when one nitrogen valence is satisfied by hydrogen and the other satisfied by attachment to carbon of an organic group consisting of carbon and hydrogen atoms. Preferably said nitrogen is derived from an amine having two primary amino radicals. Preferred of those diprimary amines are the alkylene amines having the formula: $H_2N$-(A-NH-)$_n$H wherein A is a divalent alkylene having two to 10 carbon atoms and n is an integer from 1 to 10 inclusive and the N,N'-di(aminoalkyl)piperazine wherein the aminoalkyl group has 1–10 carbon atoms as in aminomethyl, aminoethyl, aminopropyl, aminobutyl, aminopentyl, aminohexyl, aminoheptyl, amino-octyl, aminononyl and aminodecyl groups. Further illustration of the alkylene amines include dimethylene diamine, trimethylene diamine, tetramethylene diamine, pentamethylene diamine, hexamethylene diamine, heptamethylene diamine, octamethylene diamine, nonamethylene diamine and decamethylene diamine all of which are alphaomega-diamino alkanes; di- to decaethylene tri- to dodecamine, and di- to decapropylene tri- to dodecamine, di- to decabutylene tri- to dodecamine, di- to decahexylene tri- to dodecamine, and di- to decadecylene tri- to decamine.

The foregoing specific examples of the sulfonamides of this invention and their preparation are given to further enable one skilled in this art to practice this invention and to make and use the inventive sulfonamides.

EXAMPLE 1

To a reaction vessel having a stirrer, heat mantle and a water cooled reflux condenser there are charged 0.55 mole (929.5 grams) of dimer of p-polypropylphenol (polypropyl group of 753 $\overline{M}_n$ 1240 grams of hydrocarbon oil and 2.0 liters hexane. The mixture is stirred at ambient temperature until a solution forms and the solution is heated to 250°F. Thereafter chlorosulfonic acid is added dropwise to the stirred solution until 151 grams (1.3 moles) are added. Then cooling water is supplied to the reflux condenser and the stirred reaction mixture is heated until hexane refluxes and maintained under hexane reflux condition for 2 hours. At the end of such 2 hour hexane reflux, the reaction mixture is permitted to settle and sulfuric acid sludge is withdrawn.

The resulting mixture is again stirred and there is added thereto 130 grams, N,N'-di(aminopropyl)piperazine in 0.2 liter of pyridine. Hydrogen chloride is removed from the pyridine salt by adding 48 grams calcium hydroxide to the stirred reaction mixture to which there is also added 400 grams of SAE-5W grade oil. The resulting mixture is filtered to remove calcium chloride, the filtrate heated to distill off the hexane and remove pyridine. The residual solution contains 40 weight percent of the resulting bis(di-p-753 $\overline{M}_n$ polypropylphenol sulfonamide) of N,N'-di(aminopropyl)-piperazine.

To illustrate the anti-oxidant ability of the present inventive sulfonamides to inhibit oxidative thickening of crankcase lubricating oil two 10W-30 multi-grade oils are tested in each of two V-8 engines run under temperature conditions similar to an automobile towing a house trailer at express highway speeds at 90°–95°F. ambient temperature. One crankcase oil (A) has as detergent antioxidant 5.0 volume percent of the oil solution produced in Example 1. The other (B) had as detergent 5.0 volume percent of an oil solution containing 40 weight percent of Mannich Reaction product of 1769 $\overline{M}_n$ polybutyl-substituted phenol, tetraethylene pentamine and formaldehyde in the respective reactant molar ratio of 1.0:0.7:1.4 and no antioxidant. Both engines were operated 24 hours under the above engine temperature operating conditions. Samples of each oil were taken at the 12th hour of operation and every 4 hours thereafter. The oil samples were tested for 100°F. viscosity in SSU units and for carbonyl content by infrared measurements (carbonyl at 5.8$\mu$). The viscosities and carbonyl contents are tabulated below.

| Time- | Oil A | | Oil B | |
|---|---|---|---|---|
| Hours | 100°F. Viscosity | Carbonyl Content | 100°F. Viscosity | Carbonyl Content |
| 0 | 269 | | 306 | |
| 12 | 396 | 13 | 424 | 12 |
| 16 | 419 | 15 | 499 | 21 |
| 20 | 445 | 17 | 549 | 29 |
| 24 | 457 | 22 | 591 | 39 |

It has been found that increases of 100°F. viscosity to 600 from 300 SSU in the absence of antioxidant normally occurs in such hot engine tests in 24 hours of operation. About one-half of the viscosity increase is due to loss of low molecular weight components of the oil. The other 50% of viscosity increase (thickening) can be attributed to the increase in carbonyl content of the oil. From the above data the increase in 100°F. viscosity of oil A is 188 SSU units of which 150 units are attributable to loss of low molecular weight oil composites leaving only 38 SSU units increase to carbonyl content increase to 221. Oil B on the other hand suffered 285 SSU increase in 100°F. viscosity of which 135 units are from increase in carbonyl content to 39. At the 5.0 volume percent treatment with oil solution of bis(p-743 $\overline{M}_n$ polypropyl-substituted phenolsulfonamide) of N,N'-di(aminopropyl)piperazine no significant retardation of carbonyl increase related oil thickening is observed in the hot engine test.

EXAMPLE 2

The method of Example 1 is repeated except 0.55 gram mole of trimer (5348 $\overline{M}_n$) of p-polybutylphenol of 1784 $\overline{M}_n$ (polybutyl-substituent of 1691 $\overline{M}_n$) as 40 weight percent solution in SAE-10 grade oil (4412 grams solvent) is reacted with 0.55 gram mole each of sulfuryl chloride and chlorosulfonic acid in the presence of heptane. Removal of heptane by distillation also removes by-products SO$_2$ and HCl. The resulting trimeric polypropylphenolsulfuryl chloride is reacted with 0.55 mole tetraethylene pentamine added with pyridine as in Example 1. After removal of calcium chloride by filtration and pyridine by distillation, the resulting oil solution contains about 41.2 weight percent of the mono-trimeric(polybutylphenol sulfonamide) of tetraethylene pentamine.

EXAMPLE 3

The method of Example 1 is repeated except that the 0.55 gram mole of coupled phenol solute in SAE-5W grade oil (2372 grams) contains equal weight parts of hexa- and heptameric (2875 $\overline{M}_n$ of mixture) of 444 M.W. p-(n-C$_{25}$-alkyl-substituted) phenol (C$_{14}$ alkyl-substituent of 351 M.W.). The sulfonyl chloride product is reacted with 0.275 gram mole (31.9 grams) of hexamethylene diamine. The oil solution recovered after separation of calcium chloride by filtration and removal of pyridine contains about 55.6 weight percent bis(hexa- hepta-p-C$_{25}$alkylphenol sulfonamide) of hexamethylene diamine.

EXAMPLE 4

The preparation of sulfonyl chloride of tetrameric (706 $\overline{M}_n$) p-nC$_{14}$ alkyl-substituted phenol of 178 M.W. (alkyl of 85 M.W.) is conducted in the presence of hexane using one gram mole each of sulfuryl chloride and chlorosulfonic acid and 0.5 gram mole of said tetramer dissolved in 1.0 liter of hexane. The resulting disulfonylchloride of said tetramer after removal of by-product SO$_2$ and HCl are driven off by heating the reaction mixture to the temperature of hexane reflux for 4 hours, is reacted with 1 gram mole of diethylene triamine added with pyridine. Calcium chloride (formed by addition of calcium hydroxide to remove HCl) is removed by filtration and pyridine is removed while distilling off the hexene reaction solvent. The residue, bis(diethylene triamine) tetrameric p-C$_{14}$ alkylphenolsulfonamide, is soluble in gasoline, imparts detergency thereto and at concentrations of 0.15–0.5 weight percent in gasoline provides suitable detergency to clean or maintain carburetors through which crankcase vapors and gases are vented.

By reacting the disulfonyl chloride of Example 4 with one of the amine reactants before defined a linear polymeric compound (both reactants are difunctional) of the A-B type can be obtained having repeating poly p-alkylphenol units and amine units and terminating with amine units when the amine is used in two mole excess with respect to the polymeric (p-alkylphenol) disulfonyl chloride.

The sulfonamides of this invention contain the poly-(alkylphenol) sulfonyl radical of the formula:

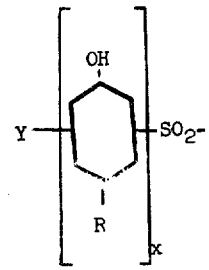

wherein $x$ is an integer from 2 to 7, Y is hydrogen or the sulfonyl radical and wherein each sulfonyl radical is attached to a nitrogen of the amines before defined. Thus said sulfonamides include monosulfonamides (Y is hydrogen), disulfonamides (Y is sulfonyl), bis-sulfonamides wherein two of the above sulfonyl radicals where Y is hydrogen are attached to two different nitrogens of said amine, and linear polysulfonamides wherein there are repeating units of said sulfonyl radical where Y is sulfonyl and units of said amine.

What is claimed is:

1. A sulfonamide having the substituted sulfonyl radical

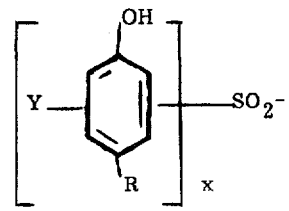

wherein $x$ is an integer from 2 to 7, R is the alkyl-substituent having a molecular weight from 85 to 3,000, and Y is hydrogen or the sulfonyl radical and wherein each sulfonyl radical is attached to a nitrogen of the aminoalkyl radical of di-(aminoalkyl) piperazine wherein the aminoalkyl-substituent has 1–10 carbon atoms.

2. The linear polymeric sulfonamide of claim 1 wherein Y is the sulfonyl radical and there are repeating units of said disulfonyl-substituted compound and units of said amine.

3. The disulfonamide of claim 1 wherein Y is the sulfonyl radical and each sulfonyl radical is attached to a nitrogen of said amine.

4. The bis-sulfonamide of claim 1 wherein Y is hydrogen and two molecules of said substituted sulfonyl radical are attached to different nitrogen atoms of said piperazine.

5. The bis-sulfonamide of claim 4 wherein $x$ is 2, R is 753 $\overline{M}_n$ polypropyl and said di(aminoalkyl) piperazine is di(aminopropyl) piperazine.

* * * * *